3,184,502
PROCESS FOR THE PRODUCTION OF
POLYAMINES
Erwin Müller, Otto Bayer, and Siegfried Petersen, Leverkusen, Germany, assignors to Farbenfabriken Bayer Aktiengesellschaft, Leverkusen, Germany, a German corporation
No Drawing. Filed June 29, 1961, Ser. No. 120,529
Claims priority, application Germany, July 9, 1960,
F 31,626
6 Claims. (Cl. 260—482)

The invention relates to a process for the production of polyamines with primary amino groups bound by aliphatic or cycloaliphatic radicals, which polyamines may be resinous.

If an attempt is made to produce polyamines by the isocyanate polyaddition process from polyisocyanates with an excess of aliphatic or cycloaliphatic diamines, if desired with concurrent use of polyhydroxyl compounds, then cross-linked products are obtained, caused by the great reactivity of the aliphatic or cycloaliphatically combined amino groups. The cross-linking is initiated by the reaction of the isocyanate groups with the hydrogen atoms of the already formed urea groups. Biuret groups are thereby formed as cross-linking points. Even under gentle conditions, it is not possible in this case to suppress undesired side reactions.

It is an object of this invention to provide a process for making polyamines by reacting polyisocyanates and primary amines devoid of the foregoing disadvantages. Another object of the invention is to provide a novel process for making polyamines which can be used as cross-linking agents for epoxy resins, as smoothening agents for textiles and as stripping agents for vat dyeing. Still another object of the invention is to provide a method for making polyamines from polyisocyanates and primary amines without excessive cross-linking.

The foregoing objects are accomplished by a process wherein an aliphatic or cycloaliphatic polyisocyanate, which may be resinous, is reacted in aqueous solution with an amido sulphonic acid. In this case, after addition of the amido sulphonic acids to the —NCO groups of the polyisocyanate has been effected, the addition product is hydrolytically split, with formation of an amino group. The chemical reactions involved are represented by the following equations:

(I) 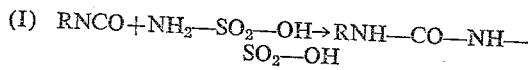

(II) 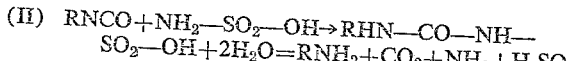

Consequently, a primary amino group is obtained for each —NCO group which reacts with the amido sulphonic acid, and carbon dioxide, ammonia and sulphuric acid are split off. However, since the reaction is carried out in aqueous solution, some of the —NCO groups which are present also react with the water, with lengthening of the chain by way of urea groups. By working at comparatively low temperatures, such as approximately at room temperature or slightly elevated temperatures, the side reaction is suppressed and polyamines are obtained with fewer urea groups and a higher content of primary amino groups. On the other hand by working at higher temperatures, such as approximately 40° C. and higher, products of higher molecular weight and containing urea groups are formed, these products having a low content of primary amino groups. In both cases, however, products are formed which contain primary aliphatically or cycloaliphatically combined amino groups as well as urea groupings.

Any suitable aliphatic or cycloaliphatic polyisocyanates may be used such as, for example, hexamethylene diisocyanate, tetramethylene diisocyanate, p-cyclohexylene diisocyanate, ethylene diisocyanate, ethylidene diisocyanate, propylene-1,2-diisocyanate and cyclohexylene-1,2-diisocyanate as well as the addition products of such isocyanates with polyhydric alcohols such as the addition product of 3 mols of hexamethylene diisocyanate with 1 mol of trimethylol propane. Polyisocyanates which are already resinous are also suitable for the process and are, in fact, preferred, such as those polyisocyanates which are obtained if polyhydroxyl compounds, such as linear or branched polyethylene ether glycols, polypropylene ether glycols, polytetrahydrofurans or hydroxyl polyesters, polythioethers or polyacetals are reacted with an excess of aliphatic or cycloaliphatic polyisocyanates. The excess in such cases is preferably so chosen that 1 mol of diisocyanate is present to 1 hydroxyl group of the polyhydroxyl compound.

Any suitable organic compound containing at least two active hydrogen containing groups as determined by the Zerewitinoff method, said groups being reactive with an isocyanate group, may be reacted with the organic polyisocyanate to form the resinous diisocyanates.

Any suitable hydroxyl polyester may be used such as are obtained, for example, from polycarboxylic acids and polyhydric alcohols. Any suitable polycarboxylic acid may be used such as, for example oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, o-phthalic acid, isophthalic acid, terephthalic acid, hemimellitic acid, trimellitic acid, trimesic acid, mellophanic acid, prehnitic acid, pyromellitic acid, citric acid, benzenepentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, butene-1,4-diol, 1,5-pentane diol, 1,4-pentane diol, 1,3-pentane diol, 1,6-hexane diol, 1,7-heptane diol, diethylene glycol, glycerine, trimethylol propane, 1,3,6-hexanetriol, triethanolamine, pentaerythritol, sorbitol and the like.

Any suitable polyhydric polythioether may be used such as, for example, the condensation product of thiodiglycol or the reaction product of a polyhydric alcohol such as in disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol having only one free hydroxyl group and at least one free primary amino group in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehyde with a polyhydric alcohol such as those disclosed above for use in the preparation of the hydroxyl polyesters.

The reaction of the components is preferably so carried out that the polyisocyanates are incorporated by stirring into an aqueous solution of the amido sulphonic acid, this taking place at room temperature if a high proportion resulting amino groups is desired, and the reaction completed at somewhat higher temperature, i.e. up about 50° C. The reaction is completed when the itially formed emulsion has changed into a clear solution. The amine which has formed can be isolated from iis solution by precipitation with bases. If it is desired to have a high yield of resulting amino groups, related to the —NCO groups present in the starting material, the mido sulphonic acid will preferably be used in at least equivalent quantities, if not in excess.

The products obtained by the process are viscous to highly viscous oils or waxes or are liquids. If resinous polyisocyanates which are based on polyethylene ether glycols are used in starting materials, the resulting polyamines are even water-soluble. The products of the process react with isocyanates even at room temperatures. They are for example suitable as smoothening agents for textiles or as stripping agents for vat dyeings. An additional example of the use thereof is as a cross-linking agent for epoxy resins.

The invention is further illustrated by the following examples in which the parts are by weight unless otherwise indicated.

EXAMPLE I

Production of the starting material

About 500 g. of linear polyproplyene ether glycol (—OH number about 270; 8.3% OH; molecular weight about 410) are introduced at about 90 to about 100° C. into about 410 g. of hexamethylene diisocyanate and heated for another hour at about 130 to about 140° C. The addition product which forms has an —NCO content of about 11.7%.

About 500 g. of starting material are incorporated by stirring into a solution of about 250 g. of amido sulphonic acid in about 1.5 litres of water at room temperature. After stirring for about 5 hours, the temperature is raised to about 50° C. and, after about another 5 hours, a clear solution is obtained. Excess ammonia is then added and the precipitated amine is taken up in n-butanol. After distilling off the solvent, about 475 g. of a viscous oil are obtained, this oil reacting with isocyanates at room temperature.

The titration with normal HCl gives an equivalent weight of about 817. The calculated molecular weight is about 694.

EXAMPLE 2

About 500 g. of a starting material obtained according to Example 1 from about 168 g. of hexamethylene diisocyanate and about 500 g. of polyproplyene ether glycol (—OH number about 112, molecular weight about 1000) and having an —NCO content of about 6.3% are incorporated by stirring into a solution of about 150 g. of amido sulphonic acid in about 500 g. of water. After stirring for about 1 hour at room temperature, the solution is heated for about 3 hours to about 50° C. and the solution is then worked up in the manner indicated in Example 1. A viscous oil is obtained which, after titration with normal —HCl has an equivalent weight of about 1440 and reacts with isocyanates.

EXAMPLE 3

About 500 g. of a starting material obtained according to Example 1 from about 370 g. of octaethylene ether glycol and about 336 g. of hexamethylene diisocyanate and having an —NCO content of about 12%, are incorporated by stirring into a solution of about 300 g. of amido sulphonic acid in about 800 g. of water. The mixture is stirred for about 1 hour at room temperature and for about 5 hours at about 50° C. and excess ammonia is added to the clear solution. The precipitated amine is taken up in butanol. After evaporating the butanol, a viscous oil is obtained which has an equivalent weight of about 990. The calculated molecular weight is about 654.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for making an aliphatic polyamine which comprises reacting —NCO groups of an aliphatic polyisocyanate with the —NH₂ group of amido sulphonic acid and thereafter hydrolytically splitting the resulting urea groups to form a polyamine.

2. The process of claim 1 wherein the reaction between the aliphatic polyisocyanate and amido sulphonic acid is conducted at a temperature of not more than about 50° C.

3. A method for making an aliphatic polyamine which comprises reacting the —NCO group of the reaction product of a polyalkylene ether glycol and an aliphatic diisocyanate with the —NH₂ group of amido sulphonic acid and thereafter hydrolytically splitting the resultant urea to form a polyamine.

4. The process of claim 1 wherein the polyisocyanate is an acyclic polyisocyanate.

5. The process of claim 1 wherein the polyisocyanate is a cycloaliphatic polyisocyanate.

6. The method of claim 1 wherein the polyisocyanate is the reaction product of an aliphatic polyisocyanate and a polyhydric alcohol.

References Cited in the file of this patent

White: J. of The Society of Dyers and Colorists, vol. 70, No. 11 (1954), TP 890.S6